(12) United States Patent
Watanabe

(10) Patent No.: US 12,360,710 B2
(45) Date of Patent: Jul. 15, 2025

(54) SETTING INFORMATION TRANSMISSION APPARATUS

(71) Applicant: CANON KABUSHIKI KAISHA, Tokyo (JP)

(72) Inventor: Tokiko Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/344,708

(22) Filed: Jun. 29, 2023

(65) Prior Publication Data

US 2024/0004590 A1    Jan. 4, 2024

(30) Foreign Application Priority Data

Jul. 4, 2022  (JP) ................................ 2022-107618

(51) Int. Cl.
*G06F 3/12* (2006.01)

(52) U.S. Cl.
CPC .......... *G06F 3/1204* (2013.01); *G06F 3/1231* (2013.01)

(58) Field of Classification Search
None
See application file for complete search history.

(56) References Cited

U.S. PATENT DOCUMENTS

| | | | |
|---|---|---|---|
| 10,091,380 B1* | 10/2018 | Robertson | H04N 1/00938 |
| 2004/0098471 A1* | 5/2004 | Shima | H04L 41/0856 |
| | | | 709/221 |
| 2005/0018241 A1* | 1/2005 | Azami | H04N 1/00204 |
| | | | 358/1.15 |
| 2015/0153981 A1* | 6/2015 | Iwasaki | H04N 1/00344 |
| | | | 358/1.14 |
| 2018/0088882 A1* | 3/2018 | Omura | G06F 3/1204 |
| 2018/0219416 A1* | 8/2018 | Van Wageningen | |
| | | | H02J 7/00309 |
| 2019/0050177 A1* | 2/2019 | Hirai | H04W 84/02 |
| 2020/0394000 A1* | 12/2020 | Takamoto | G06F 3/1254 |
| 2020/0395793 A1* | 12/2020 | Ettes | H02J 7/00308 |
| 2021/0089244 A1* | 3/2021 | Sawaguchi | G06F 3/1285 |
| 2021/0124078 A1* | 4/2021 | Widmer | B60L 53/65 |
| 2021/0218282 A1* | 7/2021 | Ettes | H02J 50/00 |
| 2022/0113663 A1* | 4/2022 | Yamamura | G03G 21/1875 |
| 2022/0173624 A1* | 6/2022 | Draak | H02J 50/60 |
| 2022/0302760 A1* | 9/2022 | Agafonov | H02J 50/60 |
| 2022/0329112 A1* | 10/2022 | Kang | H01Q 1/38 |

(Continued)

FOREIGN PATENT DOCUMENTS

| | | |
|---|---|---|
| JP | 2006020148 A | 1/2006 |
| JP | 2006201481 A | 8/2006 |
| JP | 2010117843 A | 5/2010 |

*Primary Examiner* — Helen Zong
(74) *Attorney, Agent, or Firm* — Canon U.S.A., Inc. IP Division

(57) ABSTRACT

A setting information transmission apparatus includes a storage unit configured to store setting information for a previously-made initial setting for an external apparatus, a first reception unit configured to receive information about the external apparatus and initial setting start information from the external apparatus, and a transmission unit configured to transmit, upon receiving the initial setting start information, setting information for an initial setting to the external apparatus depending on the information about the external apparatus with reference to the setting information for the previously-made initial setting for the external apparatus.

20 Claims, 6 Drawing Sheets

(56) References Cited

U.S. PATENT DOCUMENTS

| | | | |
|---|---|---|---|
| 2022/0345576 A1* | 10/2022 | Suzaki | H04N 1/00395 |
| 2023/0048919 A1* | 2/2023 | Park | H02J 50/12 |
| 2023/0108768 A1* | 4/2023 | Park | H02J 50/10 |
| | | | 307/104 |
| 2023/0126095 A1* | 4/2023 | Park | H02J 50/80 |
| | | | 307/104 |
| 2023/0246484 A1* | 8/2023 | Park | H02J 50/10 |
| | | | 320/108 |
| 2023/0283730 A1* | 9/2023 | Okajima | H04N 1/00214 |
| | | | 358/444 |
| 2023/0318363 A1* | 10/2023 | Kim | H02J 7/00034 |
| | | | 307/104 |
| 2023/0344281 A1* | 10/2023 | Kim | H02J 50/402 |
| 2023/0359404 A1* | 11/2023 | Okuno | G06F 3/1226 |
| 2023/0359417 A1* | 11/2023 | Kamiya | G06F 3/12 |
| 2024/0154466 A1* | 5/2024 | Kwon | H02J 50/12 |

* cited by examiner

SETTING INFORMATION TRANSMISSION APPARATUS

BACKGROUND

Field of the Disclosure

The present disclosure relates to a setting information transmission apparatus, a system, a processing method for the setting information transmission apparatus, and a storage medium.

Description of the Related Art

In the case of installing an apparatus for the first time (hereinafter referred to as "initial installation"), or in the case of using an apparatus after initial installation, if necessary operation for initial installation of the apparatus is not completed, or if an error has occurred in the apparatus, a user cannot use the apparatus. If the apparatus is a printing apparatus (hereinafter referred to as a "printer"), the apparatus cannot execute printing in such cases.

To properly perform the initial installation, if the apparatus includes a sufficiently large display device, an operation procedure for the initial installation of the apparatus is displayed on the display device of the apparatus. This makes it possible to provide the user with appropriate instructions for the operation procedure. On the other hand, if the apparatus does not include a sufficiently large display device and cannot provide the user with appropriate instructions for the operation procedure on the display device, the user needs to follow instructions in a manual. However, the user does not always refer to the manual. Accordingly, it may be desirable to connect the apparatus to an information processing apparatus including a sufficiently large display device to display an operation procedure depending on the state of the apparatus on the information processing apparatus.

Japanese Patent Application Laid-Open No. 2006-201481 discusses a technique related to an information processing apparatus that performs initial setup processing on the information processing apparatus. In addition, Japanese Patent Application Laid-Open No. 2010-117843 discusses a technique related to an information processing apparatus that acquires setting values of setting items from a printer, and performs setting processing on other printers.

In the case of selling a custom-made printer in which specifications are changed depending on the environment in which the printer is used in a limited way, in addition to off-the-shelf printers with uniform specifications, it may be desirable to make the same settings upon initial installation of a plurality of printers. In this case, the user needs to repeatedly perform the same operation, which takes time and labor.

In addition, the initial installation processing may require not only the processing of setting setting values, but also processing involving a manual operation such as an ink cartridge mounting operation, an ink tank mounting operation, or an ink filling operation. This makes it difficult to save the user time and labor.

SUMMARY

Embodiments of the present disclosure are directed to providing a technique for setting setting information about initial settings for an external apparatus simply or in a short period of time.

According to embodiments of the present disclosure, a setting information transmission apparatus includes a storage unit configured to store setting information for a previously-made initial setting for an external apparatus, a first reception unit configured to receive information about the external apparatus and initial setting start information from the external apparatus, and a transmission unit configured to transmit, upon receiving the initial setting start information, setting information for an initial setting to the external apparatus depending on the information about the external apparatus with reference to the setting information for the previously-made initial setting for the external apparatus.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. It should be understood that the following exemplary embodiments may be changed or improved as appropriate on the basis of the ordinary knowledge of those skilled in the art without departing from the scope of the present disclosure, and such changes or improvements also fall within the scope of the present disclosure.

A communication apparatus according to an exemplary embodiment of the present disclosure will be described. In the present exemplary embodiment, a printer (printing apparatus) is used as an example of the communication apparatus. However, the communication apparatus is not limited to this example. Various apparatuses can be applied as long as the apparatuses can establish a connection with a terminal apparatus to be described below. For example, the communication apparatus is applicable to various types of printers such as an inkjet printer, a full-color laser beam printer, and a monochrome printer. The communication apparatus is applicable not only to printers, but also to a copying machine, a facsimile apparatus, a mobile terminal, a smartphone, a personal computer (PC), a tablet terminal, a personal digital assistant (PDA), a digital camera, a smart speaker, and the like. The smart speaker is an apparatus that instructs each apparatus connected in the same network to perform processing according to an instruction based on a user's voice, and provides a user with information acquired via the network. The communication apparatus is also applicable to a multi-function peripheral including a copying function, a facsimile (FAX) function, and a printing function. While the present exemplary embodiment illustrates an example where a PC is used as the terminal apparatus, the terminal apparatus is not limited to this example. Various types of terminal apparatuses such as a mobile terminal, a smartphone, a tablet terminal, a PDA, and a digital camera can be applied.

Figure 1:
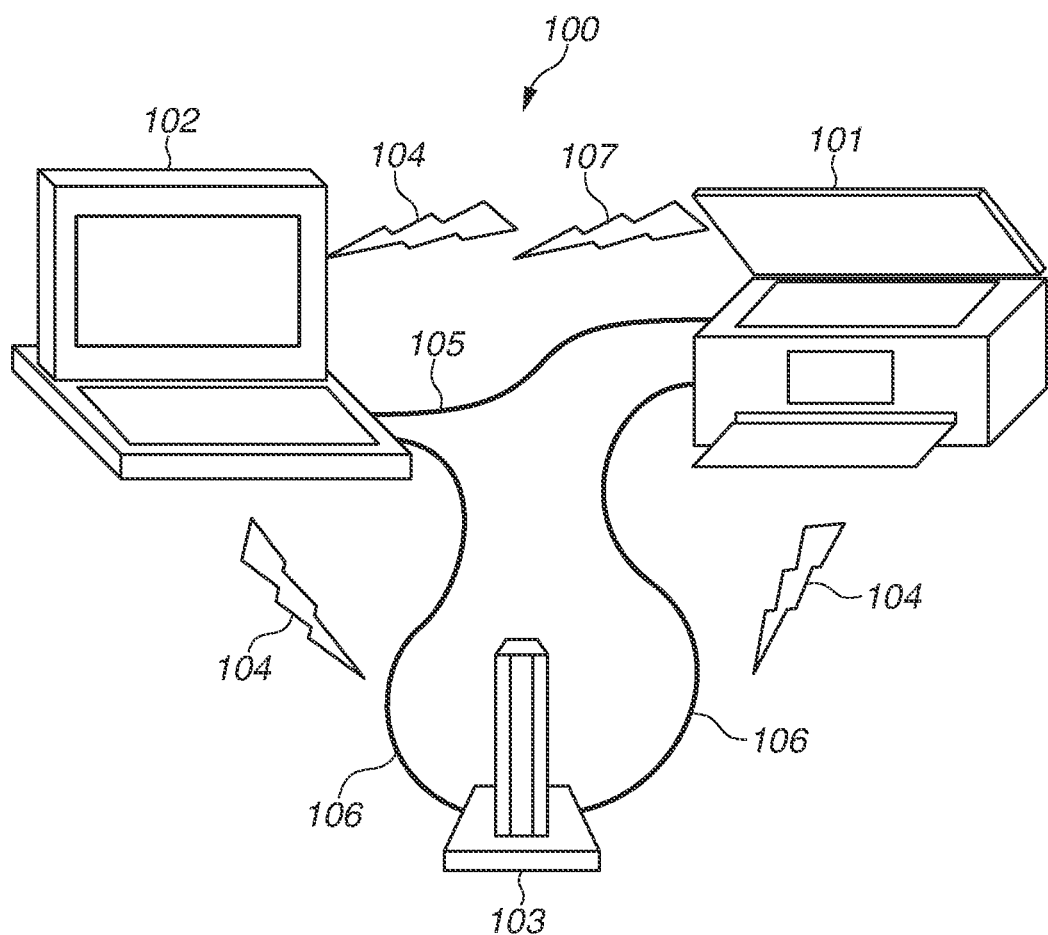
FIG. 1 illustrates a configuration example of a communication system according to an exemplary embodiment.

FIG. 1 illustrates a configuration example of a communication system 100 according to an exemplary embodiment of the present disclosure. The communication system 100 includes a communication apparatus 101, a terminal apparatus 102, and an access point 103. The communication apparatus 101 is, for example, a printer, but instead may be a copying machine, a facsimile apparatus, a mobile terminal, a smartphone, a PC, a tablet terminal, a PDA, a digital camera, a smart speaker, or the like. The terminal apparatus 102 is, for example, a PC, but instead may be a mobile terminal, a smartphone, a tablet terminal, a PDA, a digital camera, or the like.

The access point 103 is an external access point that is present on the outside of the communication apparatus 101 and the terminal apparatus 102. The terminal apparatus 102 establishes communication via the access point 103 to thereby communicate with the communication apparatus 101, which is connected to the access point 103, and the Internet.

The communication apparatus 101 is configured to be wirelessly connected to the terminal apparatus 102 in a direct connection mode in which the communication apparatus 101 is directly connected to the terminal apparatus 102 in a peer-to-peer manner without passing through the access point 103. The communication apparatus 101 is also configured to be wirelessly connected to the terminal apparatus 102 in an infrastructure mode for establishing the connection via the access point 103. A communication method used in each connection mode is not particularly limited. For example, a wireless local area network (LAN) 104 based on the standards of Institute of Electrical and Electronics Engineers (IEEE) 802.11 series, a universal serial bus (USB) 105, a wired LAN 106, and a Bluetooth® Low Energy 107 may be used.

Figure 2:
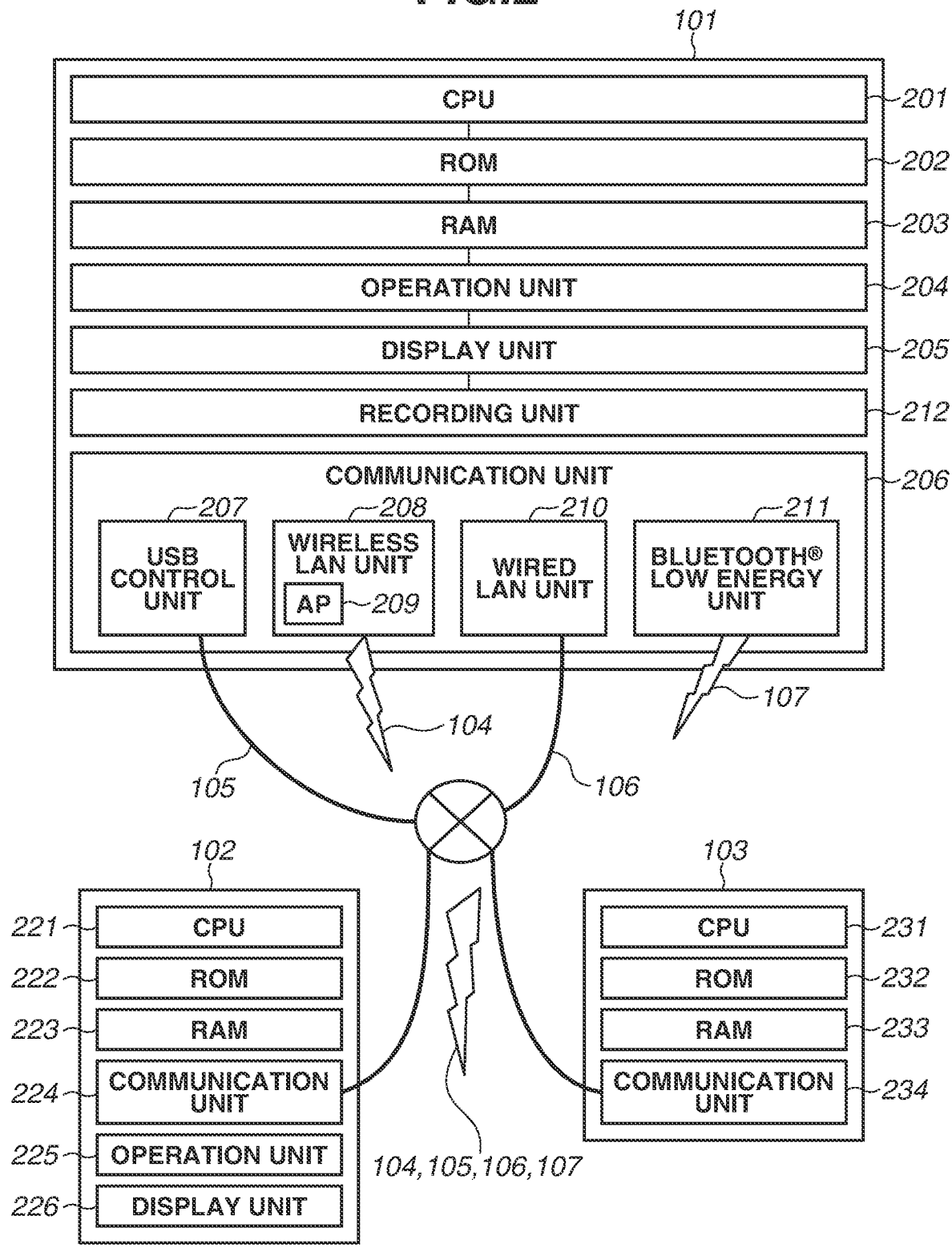
FIG. 2 is a block diagram illustrating a hardware configuration example of the communication system.

FIG. 2 is a block diagram illustrating a hardware configuration example of each of the communication apparatus 101, the terminal apparatus 102, and the access point 103 illustrated in FIG. 1. The communication apparatus 101 includes a central processing unit (CPU) 201, a read-only memory (ROM) 202, a random access memory (RAM) 203, an operation unit 204, a display unit 205, a communication unit 206, and a recording unit 212. The CPU 201 functions as a system control unit, and controls the overall operation of the communication apparatus 101.

The ROM 202 stores fixed data such as control programs to be executed by the CPU 201, data tables, and an embedded operating system (OS) program. Each control program stored in the ROM 202 performs, for example, software execution control processing such as scheduling, task switch, or interrupt processing under the control of the embedded OS program stored in the ROM 202.

The RAM 203 is composed of a static RAM (SRAM) or the like that uses a backup power supply, and holds data with a primary battery for data backup (not illustrated). The RAM 203 stores program control variables and the like. The RAM 203 is also provided with a memory area for storing setting values for wireless LAN setting and the like registered by the user, management data for the communication apparatus 101, information indicating whether a timing at which a setting for the communication apparatus 101 is made for the first time after power-on (hereinafter referred to as a "initial setting timing") is reached, and the like. In other words, the initial setting timing is an initial setting state where the communication apparatus (printer) 101 has never executed initial setting timing cleaning processing to be described below.

The operation unit 204 includes various keys and buttons such as numerical value input keys, mode setting keys, an enter key, a delete key, a cancel key, and a home button. Various keys and buttons included in the operation unit 204 may be physical keys and physical buttons, or may be software keys and software buttons to be displayed by software.

The display unit 205 is composed of a light-emitting diode (LED), a liquid crystal display (LCD), or the like, and is configured to present information to the user. In the present exemplary embodiment, assume that the display unit 205 that presents information to the user is configured using a segment display composed of an LED and the operation unit 204 that receives an operation from the user includes physical buttons.

The communication apparatus 101 is operated by the user via the operation unit 204 so that various functions of the communication apparatus 101 can be activated and various settings for the communication apparatus 101 can be made. The display unit 205 may not include a display unit composed of an LED or LCD. The display unit 205 may be configured to include a display unit composed of an LED and include no display unit composed of an LCD. The communication apparatus 101 may have a configuration in which the operation unit 204 and the display unit 205 are integrally formed using an operation display unit composed of a touch panel or the like.

In the present exemplary embodiment, the display unit 205 displays various screens. Specifically, for example, the display unit 205 displays a home screen and various notification screens. The home screen is a screen to be displayed on the display unit 205 when the communication apparatus 101 is activated (normally activated) in a state other than the initial setting timing. The home screen is a screen to be displayed on the display unit 205 when the home button in the operation unit 204 is pressed. The home screen is a screen to be displayed after the initial setting processing to be described below is completed. The user selects various icons such as keys and buttons included in the home screen, thereby making it possible to issue various processing instructions to the communication apparatus 101. For example, the user can issue printing, copying, and scanning instructions to the communication apparatus 101. The user can also issue an instruction to perform setting processing for allowing the communication apparatus 101 to use an interface selected by the user.

The recording unit 212 is a recording unit composed of a laser beam printer, an inkjet printer, or the like, and prints an image by adding a recording material onto a recording medium based on color image data or monochrome image data generated by the CPU 201. The recording medium to be used is not limited to paper, and various media such as a film may be used. The size and shape of the recording medium to be used are not particularly limited. Examples of the recording material to be used include ink and toner.

In the present exemplary embodiment, the communication apparatus 101 is, for example, an inkjet printer, and the recording unit 212 includes a recording head that ejects ink onto a recording medium, and an ink tank that holds ink to be supplied to the recording head. Also, assume that the recording unit 212 is configured to use an ink cartridge having a configuration in which the recording head and the ink tank are integrally formed. The recording unit 212 includes a carriage on which the ink cartridge is detachably mounted. The carriage is configured to scan the surface of a recording medium during printing. The communication apparatus 101 may include a cartridge sensor (detection unit) (not illustrated) to detect whether the ink cartridge is mounted on the carriage. The recording head and the ink tank may be formed separately, and the recording head and the ink tank may be mounted on different mounting portions, respectively, in the recording unit 212.

The communication apparatus 101 is also provided with a cover that covers an opening of the communication apparatus 101.

The cover is rotatable or movable between an open position where the opening of the communication apparatus 101 is open and a closed position where the opening of the communication apparatus 101 is covered. When the cover is located at the open position, the user can visually observe the inside of the communication apparatus 101 from the opening of the communication apparatus 101, and can attach the ink cartridge to the recording unit 212. The communication apparatus 101 includes a cover sensor (not illustrated) to detect whether the cover is located at the closed position. When the cover sensor detects that the cover has moved from the closed position, the communication apparatus 101 causes the cartridge to move from a standby position to an opening position (cartridge mounting position). Then, the user attaches the ink cartridge to the carriage. After that, when the cover sensor detects that the cover is located at the closed position again, the communication apparatus 101 causes the carriage to move from the cartridge mounting position to the standby position.

The communication unit 206 is configured to communicate with another apparatus, and includes a USB control unit 207, a wireless LAN unit 208, a wired LAN unit 210, and a Bluetooth® Low Energy unit 211. The wireless LAN unit 208 includes an access point 209.

The USB control unit 207 controls a USB interface connection and performs control for establishing the connection using a protocol defined by a USB connection standard. The USB connection standard is a standard that enables high-speed bidirectional data connection. The use of the USB connection standard allows a plurality of hubs or functions (slaves) to be connected to one host (master). Specifically, the USB control unit 207 converts data from a USB function control task executed by the CPU 201 into packets, and transmits USB packets to the terminal apparatus 102. Further, the USB control unit 207 converts the USB packets transmitted from the terminal apparatus 102 into data, and transmits the data to the CPU 201.

The wireless LAN unit 208 establishes a connection and communication with a network (network that can be connected based on Transmission Control Protocol (TCP)/Internet Protocol (IP)) terminal by wireless connection. The wireless LAN unit 208 is a unit that establishes a wireless connection with the access point 103 and the terminal apparatus 102. The wireless LAN unit 208 is configured to establish, for example, a data (packet) connection in a wireless LAN (hereinafter referred to as "WLAN") system conforming to the IEEE 802.11 series. In other words, the wireless LAN unit 208 is configured to establish a connection and communication with another apparatus via, for example, Wi-Fi®.

The wired LAN unit 210 is configured to establish communication via Ethernet® using a wired LAN cable. The Bluetooth® Low Energy unit 211 is configured to establish a connection and communication with another apparatus using Bluetooth® Low Energy.

By setting a communication mode, the communication apparatus 101 operates in such a way as to be able to establish communication via the wireless LAN unit 208 in a connection configuration depending on the communication mode. Specifically, in the present exemplary embodiment, the communication apparatus 101 is configured to establish communication by WLAN in the connection configuration depending on the set communication mode. Connection setting processing for setting the communication mode will be described in detail below.

The terminal apparatus 102 includes a CPU 221, a ROM 222, a RAM 223, a communication unit 224, an operation unit 225, and a display unit 226. The components of the terminal apparatus 102 are similar to the components of the communication apparatus 101 described above, and thus descriptions thereof are omitted. The terminal apparatus 102 uses the communication unit 224 to connect to the communication apparatus 101 and the access point 103 based on communication standards such as the wireless LAN 104, the USB 105, the wired LAN 106, and the Bluetooth® Low Energy 107.

The access point 103 includes a CPU 231, a ROM 232, a RAM 233, and a communication unit 234. The components of the access point 103 are similar to the components of the communication apparatus 101 described above, and thus descriptions thereof are omitted. The access point 103 uses the communication unit 234 to connect to the communication apparatus 101 and the terminal apparatus 102 based on communication standards such as the wireless LAN 104, the USB 105, the wired LAN 106, and the Bluetooth® Low Energy 107.

<Connection Setting Processing>

In the present exemplary embodiment, the terminal apparatus 102 makes a setting (connection setting) for causing the communication apparatus 101 to operate in at least one of communication modes, i.e., an infrastructure connection mode and a direct connection mode, using wireless communication with the communication apparatus 101. The connection setting processing according to the present exemplary embodiment is executed by wireless communication, and is thus referred to as cableless setup (CLS). The connection setting processing may be executed by wired communication.

The communication apparatus 101 executes the connection setting processing in a state where the communication apparatus 101 operates in a connection setting mode (connection setting state) that is a mode for executing the connection setting processing.

The terminal apparatus 102 performs the connection setting processing when a predetermined program stored in the ROM 222, an external storage device (not illustrated), or the like is run. The predetermined program is an application program for setting the access point 103 to which the communication apparatus 101 is connected, or causing the communication apparatus 101 to print image data, text data, or the like in the terminal apparatus 102. The predetermined program is hereinafter referred to as a setup program. The setup program may include other functions in addition to the function of setting the access point 103 to which the communication apparatus 101 is connected and the printing function. For example, if the communication apparatus 101 includes a scanning function, the setup program may include a function for scanning a document set on the communication apparatus 101, a function for making other settings for the communication apparatus 101, a function for checking the state of the communication apparatus 101, and the like.

In the case of connecting the access point 103 and the communication apparatus 101 to each other and causing the communication apparatus 101 to operate in the infrastructure connection mode, the terminal apparatus 102 wirelessly transmits infrastructure setting information for allowing the communication apparatus 101 to operate in the infrastructure connection mode to the communication apparatus 101. Examples of the infrastructure setting information include information about the access point 103. Examples of the information about the access point 103 include a service set identifier (SSID) of the access point 103, a password for establishing a connection with the access point 103, and information about a frequency band to be used by the access point 103.

On the other hand, in the case of causing the communication apparatus 101 to operate in the direct connection mode, the terminal apparatus 102 wirelessly transmits direct setting information for allowing the communication apparatus 101 to operate in the direct connection mode to the communication apparatus 101. The direct setting information includes an instruction to enable a Wi-Fi® direct (WFD) function to operate as a group owner, or an instruction to activate the access point 209 in the communication apparatus 101. The terminal apparatus 102 acquires connection information for establishing a direct connection with the communication apparatus 101 from the communication apparatus 101. Examples of the connection information for establishing a direct connection with the communication apparatus 101 include an SSID of the communication apparatus 101 and a password for establishing a connection with the communication apparatus 101.

In the direct connection for connection setting, for example, wireless communication standards other than Wi-Fi® and Bluetooth® Low Energy, such as Classic Bluetooth®, may be used, and wired communication standards such as a wired LAN and a USB may be used.

After the infrastructure connection or direct connection using Wi-Fi® is established between the terminal apparatus 102 and the communication apparatus 101 by the connection setting processing, the terminal apparatus 102 and the communication apparatus 101 can communicate with each other via the established connection. Specifically, for example, the terminal apparatus 102 is configured to transmit a print job for causing the communication apparatus 101 to execute printing, a status, and a scanning job for causing the communication apparatus 101 to execute scanning to the communication apparatus 101 via the established connection.

<Processing to be Executed During Initial Setting>

Figure 3:
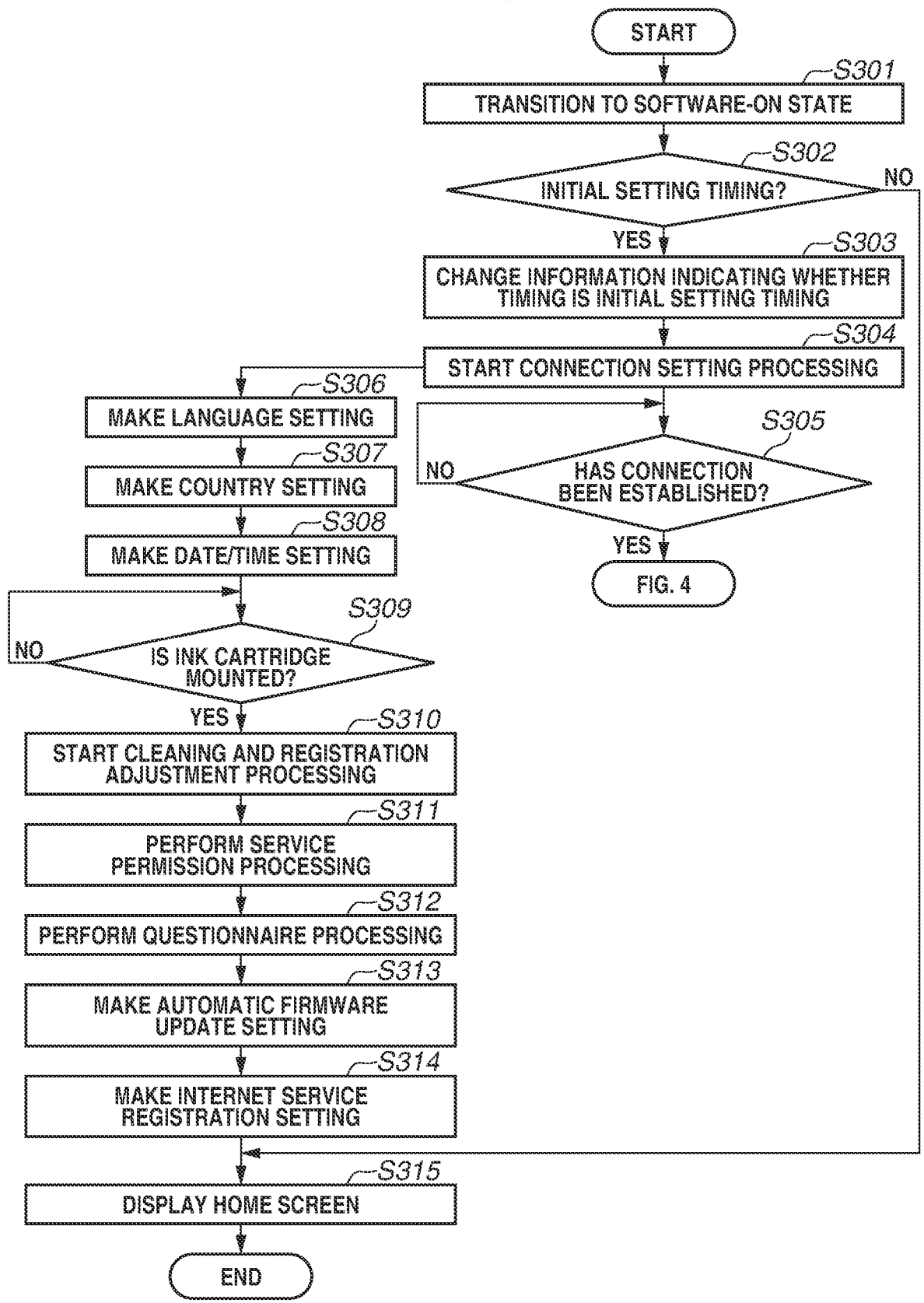
FIG. 3 is a flowchart illustrating initial setting processing to be performed by a communication apparatus.

FIG. 3 is a flowchart illustrating an initial setting processing method to be executed by the communication apparatus 101 according to the present exemplary embodiment. The flowchart of FIG. 3 is implemented such that the CPU 201 loads control programs for the flowchart stored in the ROM 202 or the external storage device (not illustrated) into the RAM 203, and the CPU 201 executes the control programs. The flowchart of FIG. 3 is started when the communication apparatus 101 is in a power-off state.

First, in step S301, if the CPU 201 detects that a power button provided in the communication apparatus 101 is pressed (power-on operation is executed), the CPU 201 causes the communication apparatus 101 to transition to a power-on state (software-on state) from the power-off state.

Next, in step S302, the CPU 201 determines whether the communication apparatus 101 is in the initial setting timing by referring to information indicating whether the communication apparatus 101 is in the initial setting timing stored in the RAM 203. Specifically, when the user activates the communication apparatus 101 for the first time after the initial setting, an initial setting timing flag is on in the RAM 203. On the other hand, in the start-up processing for the communication apparatus 101 performed for the second and subsequent times after the initial setting, the initial setting timing flag is off in the RAM 203. The CPU 201 makes the determination in step S302 by referring to the on/off state of the initial setting timing flag. This determination may be made by, for example, determining whether the communication apparatus 101 has previously executed an initial setting timing sequence.

If the CPU 201 determines that the communication apparatus 101 is not in the initial setting timing (NO in step S302), the processing proceeds to step S315 without executing the connection setting processing. In general, if the communication apparatus 101 is not in the initial setting timing, except for a timing when the connection environment of the communication apparatus 101 has changed, for example, there is no need to set the communication mode again. Accordingly, this configuration prevents the communication apparatus 101 from performing the processing of setting the communication mode every time the communication apparatus 101 transitions to the software-on state. In this case, the CPU 201 may be configured to display a user interface (UI) or the like to ask the user whether to perform the processing of setting the communication mode, and to perform the processing of setting the communication mode depending on a response from the user. On the other hand, if the CPU 201 determines that the communication apparatus 101 is in the initial setting timing (YES in step S302), the processing proceeds to step S303.

In step S303, the CPU 201 changes information indicating whether the communication apparatus 101 is in the initial setting timing in such a manner as to indicate that the timing at which the communication apparatus 101 transitions to the software-on state next time or later is not the initial setting timing. Specifically, the CPU 201 updates the content of the initial setting timing flag. In the present exemplary embodiment, the CPU 201 executes the processing in step S302 using the on/off state of the initial setting timing flag. However, the CPU 201 may use information other than the flag. In this case, assume that, for example, the CPU 201 stores information indicating that the communication apparatus 101 is in the initial setting timing in the RAM 203 in the initial setting. In step S302, the CPU 201 determines whether the information indicating that the communication apparatus 101 is in the initial setting timing is stored in the RAM 203. Then, in the subsequent processing, the CPU 201 deletes the information indicating that the communication apparatus 101 is in the initial setting timing. The processing in step S303 may be executed at any timing after the determination as to whether the communication apparatus 101 is in the initial setting timing is made.

Next, in step S304, the CPU 201 starts the connection setting processing. After the infrastructure connection or direct connection using Wi-Fi® is established between the terminal apparatus 102 and the communication apparatus 101 by the connection setting processing, the terminal apparatus 102 and the communication apparatus 101 can communicate with each other via the established connection. After that, the CPU 201 performs the processing in step S305 and the processing in step S306 in parallel.

In step S305, the CPU 201 determines whether the communication connection between the terminal apparatus 102 and the communication apparatus 101 is completed (established). If the communication connection is not completed (NO in step S305), the processing returns to step S305. If the communication connection is completed (YES in step S305), the processing proceeds to a flowchart illustrated in FIG. 4 to start initial setting status processing with the terminal apparatus 102. The processing in the flowchart of FIG. 4 will be described below. The processing in step S306 and subsequent steps is executed in parallel with the processing in the flowchart of FIG. 4.

In step S306, the CPU 201 prompts the user to make a language setting by blinking the LED of the display unit 205, or by displaying a specific screen on the LCD of the display unit 205, and accepts a language setting operation performed by the user. The subsequent setting processing will be described below with reference to FIG. 4.

Next, in step S307, the CPU 201 prompts the user to make a country setting by blinking the LED of the display unit 205, or by displaying a specific screen on the LCD of the display unit 205, and accepts a country setting operation performed by the user.

Next, in step S308, the CPU 201 prompts the user to make a date/time setting by blinking the LED of the display unit 205, or by displaying a specific screen on the LCD of the display unit 205, and accepts a date/time setting operation performed by the user.

Next, in step S309, the CPU 201 determines whether the ink cartridge is mounted on the recording unit 212 based on a detection result from the detection unit. In a configuration in which the recording head and the ink tank are formed separately, the CPU 201 determines whether both the recording head and the ink tank are mounted on the recording unit 212, or determines whether at least the recording head is mounted on the recording unit 212. If the ink cartridge is mounted (YES in step S309), the processing proceeds to step S310. If the ink cartridge is not mounted (NO in step S309), the processing returns to step S309.

If the ink cartridge is not mounted, the ink cartridge is not mounted on the recording unit 212 before the communication apparatus 101 transitions to the power-on state (i.e., the communication apparatus 101 is in the power-off state).

Accordingly, in step S309, the CPU 201 provides the user with a notification about the recording unit 212 by blinking the LED of the display unit 205, or by displaying a specific screen on the LCD of the display unit 205. Specifically, the CPU 201 provides the user with a notification indicating that the communication apparatus 101 is in a state of waiting for mounting of the ink cartridge, or provides the user with a notification about an ink cartridge mounting method. The notification method is not particularly limited. For example, the CPU 201 may provide the notification using sound from a speaker (not illustrated).

The determination in step S309 is repeatedly made until it is determined that the ink cartridge is mounted, without setting a timeout for the determination in step S309, or until the communication apparatus 101 transitions to the power-off state. Further, the CPU 201 may continuously execute the notification processing in step S309 until it is determined that the ink cartridge is mounted.

In step S310, the CPU 201 causes the carriage to move to a position where a cleaning member such as a waste ink absorption band or a capping mechanism for capping ejection ports of the recording head is placed. After that, the CPU 201 caps the ejection ports of the recording head with the capping mechanism and actuates a pump connected to the capping mechanism. With this operation, the CPU 201 generates a negative pressure inside the capping mechanism to suction and discharge foreign substances, such as thicker ink and air bubbles, from the ejection ports, thereby refreshing ink inside the ejection ports. The CPU 201 wipes foreign substances such as ink adhering to the ejection port surface of the recording head (cleaning by wiping) with a wiper.

This cleaning processing is also executed at a timing other than the initial setting timing, such as a timing before printing start, a timing at which a predetermined time has elapsed since the previous printing, or a timing at which the communication apparatus 101 transitions to the software-on state after an abnormal termination.

Such normal cleaning processing may be different from the initial setting timing cleaning processing. For example, the initial setting timing cleaning processing may be performed for the purpose of filling a flow channel from the recording head to a nozzle, or a flow channel from the ink tank to the ink head, with ink so that negative pressure suction power can be increased, the amount of suction can be increased, or the number of times of suction can be increased compared with those in the normal cleaning processing. Alternatively, the initial setting timing cleaning processing may be performed such that ink in the recording head is heated to decrease the viscosity of the ink compared with that in the normal cleaning processing.

In the case of executing the initial setting timing cleaning processing, the CPU 201 detects an error that has occurred in the recording unit 212. Examples of the error to be detected at this time include a head incomplete mounting error and a carriage position error.

The head incomplete mounting error is an error in which the ink cartridge (recording head) is mounted on the cartridge in an incomplete manner. For example, if the ink cartridge is mounted on the carriage in an incomplete manner, the ink cartridge may protrude into a drive path of the carriage. In this case, during movement of the carriage, the ink cartridge may collide with a given component in the communication apparatus 101, so that the cartridge may stop at the position of the component. For example, the CPU 201 detects the amount of movement of the carriage, and if the detected amount of movement corresponds to the mount of movement from the cartridge mounting position to the position of the component, the CPU 201 detects that the head incomplete mounting error is occurring. For example, if the ink cartridge is mounted on the carriage in an incomplete manner, the ink cartridge may come off from the carriage during movement of the carriage or during the cleaning processing. For example, the CPU 201 detects, by the cartridge sensor, whether the ink cartridge is mounted on the carriage. If the cartridge sensor detects that the ink cartridge is not mounted on the carriage during movement of the carriage or during the cleaning processing, the CPU 201 detects the head incomplete mounting error has occurred. Because the head incomplete mounting error can be resolved by re-opening the cover and correctly re-attaching the ink cartridge by the user, the communication apparatus 101 does not need to transition to the power-off state to resolve the head incomplete mounting error.

The carriage position error is an error in which foreign substances are present in the drive path of the carriage. For example, if foreign substances are present in the drive path of the carriage, the foreign substance hinder the movement of the carriage, so that the amount of movement of the carriage decreases. Accordingly, the CPU 201 detects, for example, the actual amount of movement of the carriage and a force (driving force) required for driving the carriage, and if the actual amount of movement is smaller than the driving force, the CPU 201 detects that the carriage position error has occurred. The carriage position error is resolved when the communication apparatus 101 transitions to the power-off state and foreign substances are removed.

Upon detecting an error, the CPU 201 executes error notification processing to provide a notification about the detected error. Specifically, for example, the CPU 201 displays a screen for providing a notification about the detected error on the display unit 205. In a case where an error is detected, if the communication apparatus 101 has established the communication connection with the terminal apparatus 102 by starting the connection setting processing in step S304, the CPU 201 transmits information to display the detected error on the display unit 226 included in the terminal apparatus 102 to the terminal apparatus 102. The CPU 201 may be configured to execute error notification processing if an inquiry is received from the terminal apparatus 102 with which the communication apparatus 101 has established the communication connection.

While the present exemplary embodiment illustrates an example where the initial setting timing cleaning processing is to be performed at the initial setting timing, the configuration according to the present exemplary embodiment is not limited to this example. For example, the processing to be performed at the initial setting timing may include registration adjustment processing.

Next, in step S311, the CPU 201 prompts the user to perform service permission processing by blinking the LED of the display unit 205, or by displaying a specific screen on the LCD of the display unit 205, and then performs service permission processing based on a permission operation performed by the user.

Next, in step S312, the CPU 201 prompts the user to perform questionnaire processing by blinking the LED of the display unit 205, or by displaying a specific screen on the LED of the display unit 205, and then performs questionnaire processing based on a questionnaire operation performed by the user.

Next, in step S313, the CPU 201 prompts the user to make an automatic firmware update setting by blinking the LED of the display unit 205, or by displaying a specific screen on the LCD of the display unit 205, and accepts an operation performed by the user.

Next, in step S314, the CPU 201 prompts the user to make an Internet service registration setting by blinking the LED of the display unit 205, or by displaying a specific screen on the LCD of the display unit 205, and accepts an operation performed by the user.

Next, in step S315, the CPU 201 provides the user with a notification indicating that the initial setting processing is completed by blinking the LED of the display unit 205, or by displaying a specific screen on the LCD of the display unit 205. Further, the CPU 201 displays the home screen on the display unit 205, and terminates the processing in the flowchart of FIG. 3.

Figure 4:
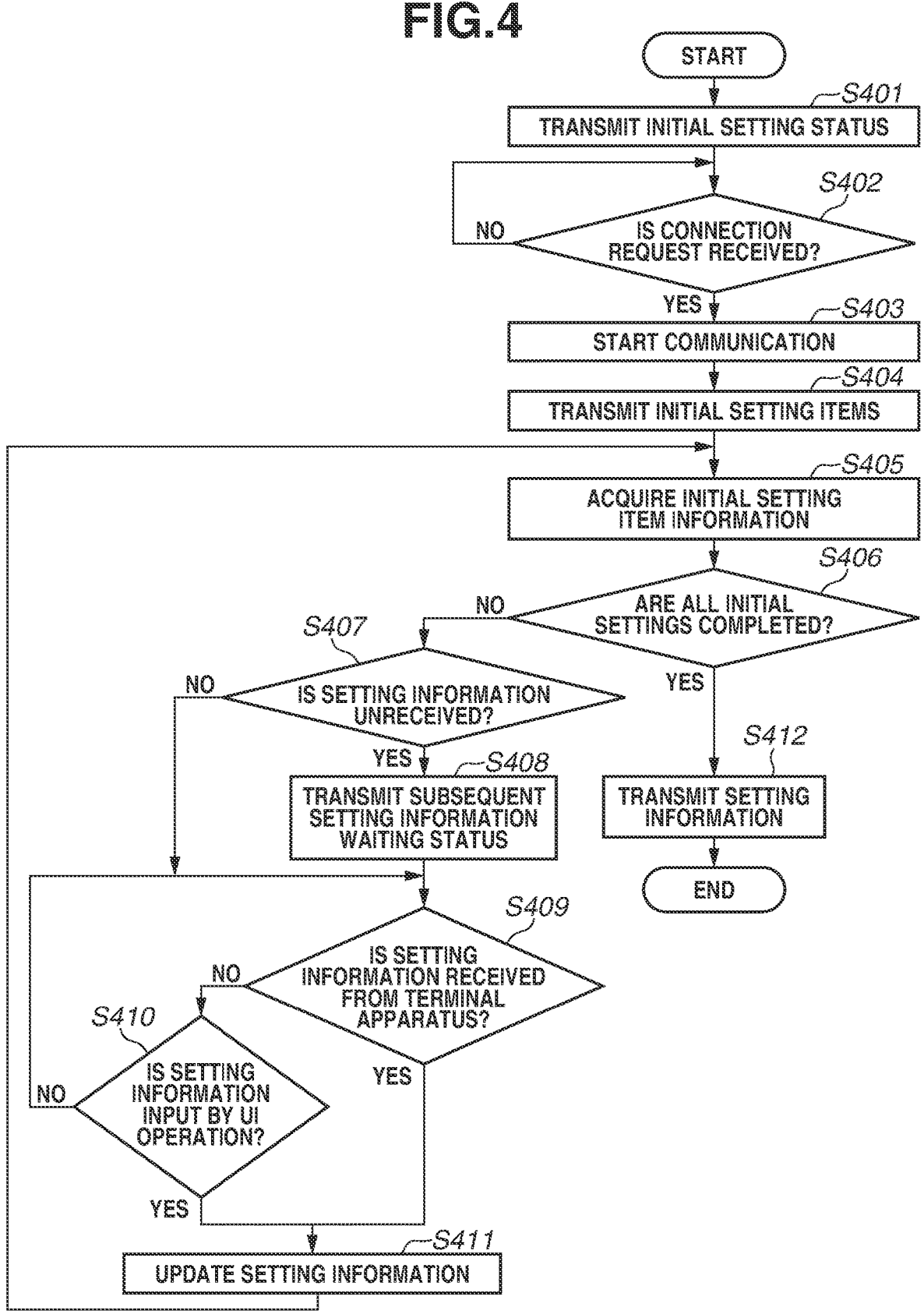
FIG. 4 is a flowchart illustrating initial setting status processing to be performed by the communication apparatus.

FIG. 4 is a flowchart illustrating an initial setting status processing method to be executed by the communication apparatus 101 after step S305 illustrated in FIG. 3.

First, in step S401, the CPU 201 transmits an initial setting status indicating that the communication apparatus 101 is making initial settings into the same network in a state where the communication apparatus 101 has established the communication connection with the terminal apparatus 102. The terminal apparatus 102 that has received the initial setting status starts to establish a connection to communicate a status and a setting command. The initial setting status processing to be performed in parallel by the terminal apparatus 102 will be described in detail below with reference to FIG. 5.

Next, in step S402, the CPU 201 determines whether a connection request is received from the terminal apparatus 102. If the connection request is not received (NO in step S402), the processing returns to step S402. If the connection request is received (YES in step S402), the processing proceeds to step S403.

In step S403, the CPU 201 causes the communication unit 206 to start communication with the terminal apparatus 102.

Next, in step S404, the CPU 201 causes the communication unit 206 to transmit initial setting items to be executed in the initial setting processing to the terminal apparatus 102. The terminal apparatus 102 checks the initial setting items, and then the processing proceeds to the initial setting status processing. The initial setting status processing will be described in detail below with reference to FIG. 5.

Next, in step S405, the CPU 201 acquires initial setting item information (items and the order of items to be executed) for the initial setting processing.

Next, in step S406, the CPU 201 determines whether the settings for all the initial setting items are completed. If the initial settings for all the initial setting items are not completed (NO in step S406), the processing proceeds to step S407. If the initial settings for all the initial setting items are completed (YES in step S406), the processing proceeds to step S412.

In step S407, the CPU 201 determines whether setting information for the subsequent initial setting item is unreceived from the terminal apparatus 102. If the setting information for the subsequent initial setting item is unreceived (YES in step S407), the processing proceeds to step S408. If the setting information for the subsequent initial setting item is received (NO in step S407), the processing proceeds to step S409.

In step S408, the CPU 201 causes the communication unit 206 to transmit a status indicating that the CPU 201 is in the state of waiting for the setting information for the subsequent initial setting item to the terminal apparatus 102. Then, the processing proceeds to step S409.

In step S409, the CPU 201 determines whether the communication unit 206 has received the setting information for the initial setting item from the terminal apparatus 102. If the setting information for the initial setting item is received from the terminal apparatus 102 (YES in step S409), the processing proceeds to step S411. If the setting information for the initial setting item is not received from the terminal apparatus 102 (NO in step S409), the processing proceeds to step S410.

In step S410, the CPU 201 determines whether the setting information for the initial setting item is input by a UI operation on the operation unit 204. This input corresponds to the processing in steps S306 to S314 illustrated in FIG. 3. If the setting information for the initial setting item is not input by the UI operation on the operation unit 204 (NO in step S410), the processing returns to step S409. If the setting information for the initial setting item is input by the UI operation on the operation unit 204 (YES in step S410), the processing proceeds to step S411.

In step S411, the CPU 201 updates and sets the setting information for the initial setting item for the communication apparatus 101 depending on the received or input setting information for the initial setting item. Then, the processing returns to step S405 to start processing on the subsequent initial setting item.

In step S412, the CPU 201 causes the communication unit 206 to transmit the setting information for all the initial setting items for the communication apparatus 101 to the terminal apparatus 102, and then the processing in the flowchart of FIG. 4 is terminated.

Figure 5:
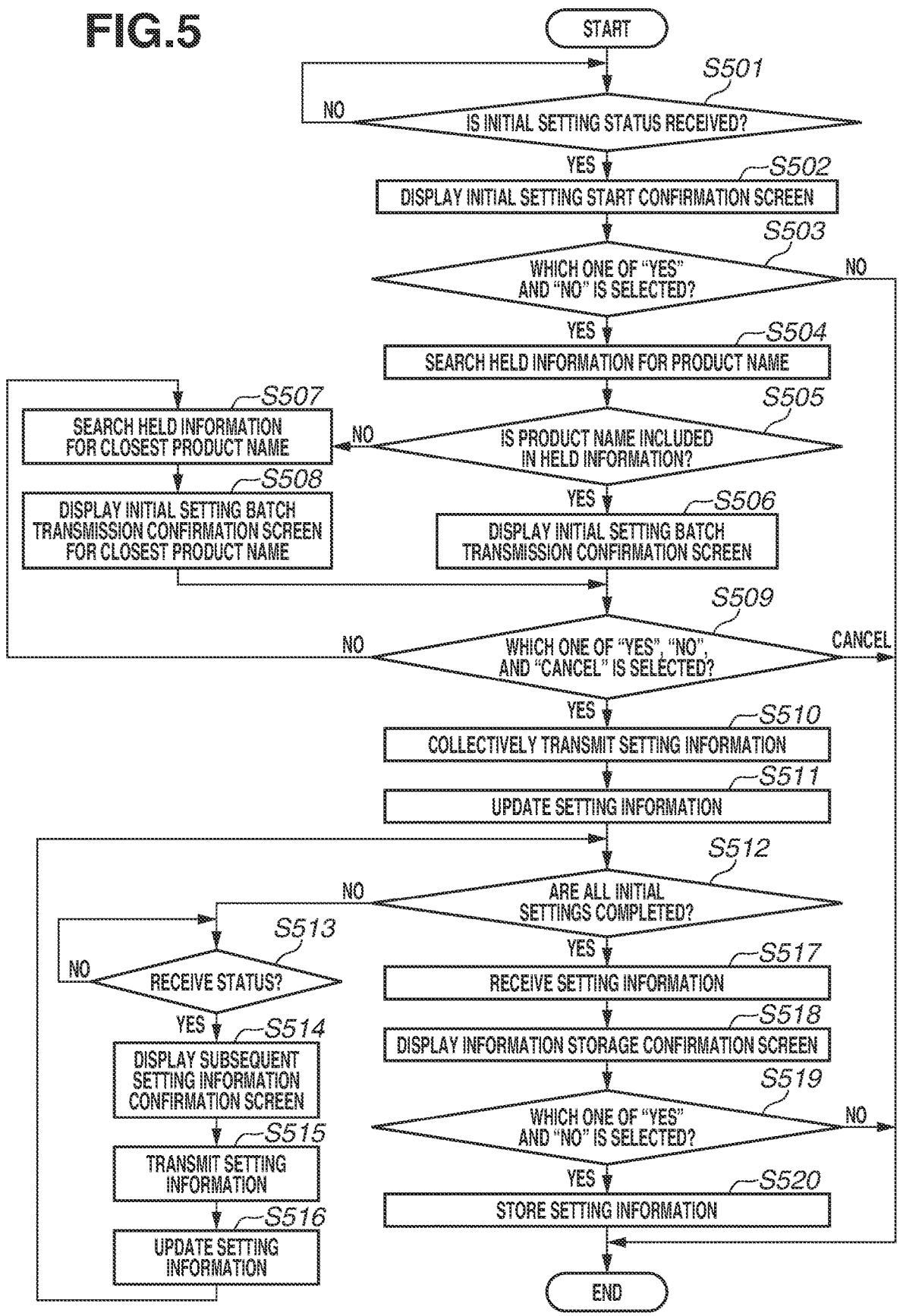
FIG. 5 is a flowchart illustrating initial setting status processing to be performed by a terminal apparatus.
Figure 6A:
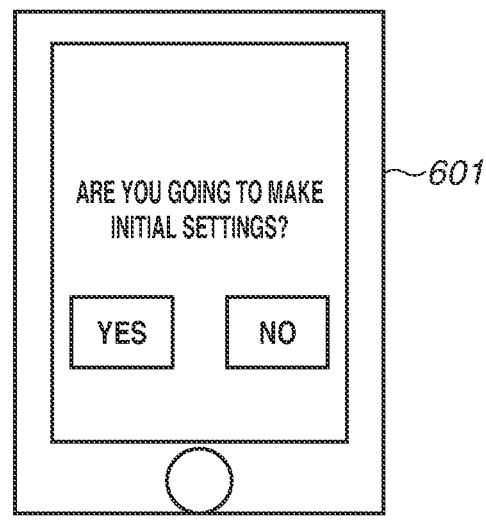
FIGS. 6A, 6B, and 6C illustrate examples of a screen to be displayed on the terminal apparatus.
Figure 6B:
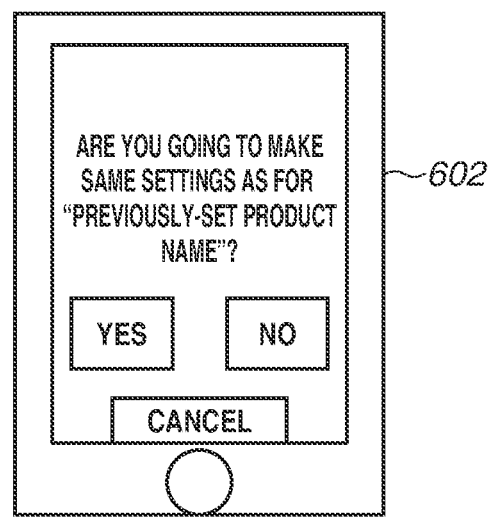
Figure 6C:
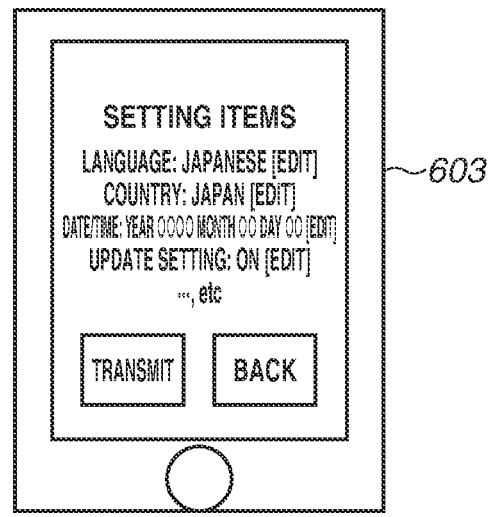

FIG. 5 is a flowchart illustrating an initial setting status processing method to be executed by the terminal apparatus 102 according to the present exemplary embodiment. FIGS. 6A to 6C illustrate examples of a screen to be displayed on the display unit 226 of the terminal apparatus 102.

First, in step S501, the CPU 221 determines whether the communication unit 224 has received an initial setting status from the communication apparatus 101. The initial setting status includes product name information about the communication apparatus 101. If the initial setting status is not received (NO in step S501), the processing returns to step S501. If the initial setting status is received (YES in step S501), the processing proceeds to step S502.

In step S502, the CPU 221 displays a "initial setting start confirmation" screen 601 illustrated in FIG. 6A on the display unit 226. The screen 601 displays a message "Are you going to make initial settings?"

The user operates the operation unit 225 to select "YES" or "NO" on the screen 601.

Next, in step S503, the CPU 221 determines whether which one of "YES" and "NO" is selected. If the CPU 221 determines that "YES" is selected, the processing proceeds to step S504. If "NO" is selected, the processing in the flowchart of FIG. 5 is terminated.

In step S504, the CPU 221 searches held information for a product name (model) of the communication apparatus 101 based on the product name information (model information) of the communication apparatus 101 included in the initial setting status received in step S501. The CPU 221 stores, as the held information, the product name information about the communication apparatus 101 that has previously made initial settings and setting information for initial setting items.

Next, in step S505, the CPU 221 determines whether the product name of the communication apparatus 101 is included in the held information. If the product name of the communication apparatus 101 is included in the held information (YES in step S505), the processing proceeds to step S506. If the product name of the communication apparatus 101 is not included in the held information (NO in step S505), the processing proceeds to step S507.

In step S506, the CPU 221 displays a "initial setting batch transmission confirmation" screen 602 illustrated in FIG. 6B. The screen 602 displays a message "Are you going to make the same settings as for the 'previously-set product name' ?" The user selects "YES", "NO", or "CANCEL" on the screen 602 with the operation unit 225. Then, the processing proceeds to step S509.

In step S507, the CPU 221 searches the held information for the product name that is closest to the product name of the communication apparatus 101 based on the product name information about the communication apparatus 101 included in the initial setting status received in step S501.

In step S508, the CPU 221 displays a "initial setting batch transmission confirmation" screen for the product name that is closest to the product name of the communication apparatus 101 on the display unit 226, like the screen 602 illustrated in FIG. 6B. This screen displays a message "Are you going to make the same settings as for the 'previously-set closest product name' ?" The user selects "YES", "NO", or "CANCEL" on the screen with the operation unit 225. Then, the processing proceeds to step S509.

In step S509, the CPU 221 determines which one of "YES", "NO", and "CANCEL" is selected. If the CPU 221 determines that "YES" is selected, the processing proceeds to step S510. If "NO" is selected, the processing returns to step S507. If "CANCEL" is selected, the processing in the flowchart of FIG. 5 is terminated.

In step S510, the CPU 221 displays an "initial setting batch transmission content confirmation" screen 603 illustrated in FIG. 6C on the display unit 226. The screen 603 displays setting information for initial setting items corresponding to the product name used in step S506 in the held information or the closest product name used in step S508, and prompts the user to select "TRANSMIT" or "BACK". Examples of the setting information for the initial setting items include the setting information for the initial setting items used in steps S306 to S308, S313, and S314 illustrated in FIG. 3. The user selects "TRANSMIT" or "BACK" on the screen 603 with the operation unit 225. If "TRANSMIT" is selected, the CPU 221 causes the communication unit 224 to collectively transmit the setting information for the initial setting items corresponding to the product name used in step S506 in the held information or the closest product name used in step S508 to the communication apparatus 101.

Next, in step S511, the CPU 221 updates the setting information for the initial setting items corresponding to the product name used in step S506 in the held information or the closest product name used in step S508 with the setting information for the initial setting items for the communication apparatus 101.

Next, in step S512, the CPU 221 determines whether the setting processing on all the initial setting items is completed. If the setting processing on all the initial setting items is not completed (NO in step S512), the processing proceeds to step S513. If the setting processing on all the initial setting items is completed (YES in step S512), the processing proceeds to step S517.

In step S513, the CPU 221 determines whether the communication unit 224 has received a status indicating that the CPU 221 is in the state of waiting for the setting information for the subsequent initial setting item from the communication apparatus 101 to deal with the transmission in step S408 illustrated in FIG. 4. If the CPU 221 determines that the status is not received (NO in step S513), the processing returns to step S513. If the status is received (YES in step S513), the processing proceeds to step S514.

In step S514, the CPU 221 selects the setting information for the subsequent initial setting item according to a user operation, and displays a transmission confirmation screen for the selected setting information for the subsequent initial setting item on the display unit 226. For example, the CPU 221 selects the setting information for the service permission processing in step S311 illustrated in FIG. 3 and the setting information for the questionnaire processing in step S312 illustrated in FIG. 3 according to a user operation. These pieces of setting information requires a manual operation to be performed by the user.

Next, in step S515, if "TRANSMIT" is selected by a user operation, the CPU 221 causes the communication unit 224 to transmit the selected setting information for the subsequent initial setting item to the communication apparatus 101. In step S409 illustrated in FIG. 4, the communication apparatus 101 receives the setting information.

Next, in step S516, the CPU 221 updates the setting information for the initial setting items for the communication apparatus 101 based on the selected setting information for the subsequent initial setting item. Then, the processing returns to step S512 to start the setting processing on the subsequent initial setting item.

In step S517, the CPU 221 causes the communication unit 224 to receive the setting information for all initial setting items for the communication apparatus 101 from the communication apparatus 101 to deal with the transmission in step S412 illustrated in FIG. 4.

Next, in step S518, the CPU 221 displays a confirmation screen to confirm whether to store the received setting information for all the initial setting items for the communication apparatus 101 on the display unit 226. The user selects "YES" or "NO" on the screen with the operation unit 225.

Next, in step S519, the CPU 221 determines whether which one of "YES" and "NO" is selected. If the CPU 221 determines "YES" is selected, the processing proceeds to step S520. If "NO" is selected, the processing in the flowchart of FIG. 5 is terminated.

In step S520, the CPU 221 stores, as the held information, the setting information for initial setting items that can be collectively set in the received setting information for all the initial setting items for the communication apparatus 101 in association with the product name of the communication apparatus 101. The setting information for the initial setting items that can be collectively set is, for example, the setting information for the initial setting items used in steps S306 to S308, S313, and S314 illustrated in FIG. 3, and the information transmitted in step S510. Then, the CPU 221 terminates the processing in the flowchart of FIG. 5.

The CPU 221 may store not only the product name of the communication apparatus 101, but also an execution date and time, a network environment in which settings are made, and the like in an associated manner. In this case, the CPU 221 stores the setting information for the initial setting items that can be collectively set as the held information in association with the product name of the communication apparatus 101, the network environment, or the like. In step S504, the CPU 221 receives the product name of the communication apparatus 101, the network environment, or the like from the communication apparatus 101, and searches the held information for the setting information for the initial setting items corresponding to the product name of the communication apparatus 101, the network environment, or the like received from the communication apparatus 101. Further, the CPU 221 may update and set the setting information for the initial setting items corresponding to the product name of the communication apparatus 101, the network environment, or the like.

In step S510, the CPU 221 transmits the setting information for the initial setting items that can be collectively set to the communication apparatus 101. However, the configuration of the CPU 221 is not limited to this configuration. For example, the CPU 221 may first transmit only the setting information for the language setting, prompt the user to perform an ink cartridge mounting operation in the communication apparatus 101, and collectively transmit the setting information for the rest of the initial setting items. If it is determined that the ink cartridge is not mounted in step S309 illustrated in FIG. 3, the communication apparatus 101 displays an ink cartridge mounting method on the display unit 205. To display the ink cartridge mounting method, it may be desirable to have the language set for the display. Accordingly, it may be desirable for the CPU 221 to first transmit only the language setting information.

For example, in the case of making initial settings on the first communication apparatus 101, the terminal apparatus 102 first receives an initial setting status including the product name from the communication apparatus 101. Next, the terminal apparatus 102 sequentially selects setting information for the language setting, setting information for the country setting, and setting information for the date/time setting according to a user operation, and transmits the selected setting information to the communication apparatus 101. The communication apparatus 101 makes settings for the received setting information.

Then, the user performs the ink cartridge mounting operation on the communication apparatus 101. After that, the terminal apparatus 102 sequentially selects setting information for permission processing, setting information for questionnaire processing, and the like according to a user operation, and transmits the selected setting information to the communication apparatus 101. The communication apparatus 101 makes settings for the received setting information. The terminal apparatus 102 stores, as the held information, the setting information for the initial setting items described above in association with the product name of the first communication apparatus 101.

To make initial settings for the second communication apparatus 101, the terminal apparatus 102 first receives an initial setting status including the product name from the communication apparatus 101. Next, the terminal apparatus 102 refers to the held information, and if the product name of the second communication apparatus 101 matches the product name of the first communication apparatus 101, the terminal apparatus 102 transmits the setting information for the language setting of the first communication apparatus 101 to the communication apparatus 101.

The communication apparatus 101 makes settings for the received setting information, and displays an ink cartridge mounting method in the set language. After that, the user performs the ink cartridge mounting operation on the communication apparatus 101. After that, the terminal apparatus 102 refers to the held information, and if the product name of the second communication apparatus 101 matches the product name of the first communication apparatus 101, the terminal apparatus 102 collectively transmits the setting information for the rest of the initial setting items from among the setting information for the initial setting items for the first communication apparatus 101 to the communication apparatus 101. The communication apparatus 101 makes settings for the received setting information. The terminal apparatus 102 may collectively transmit the setting information for all initial setting items to the communication apparatus 101. This enables the user to make initial settings for the second and more communication apparatuses 101 simply and in a short period of time.

As described above, the communication system 100 includes the communication apparatus 101, the terminal apparatus 102, and the access point 103. The communication apparatus 101 is an example of a setting information transmission apparatus according to an exemplary embodiment of the present disclosure. The terminal apparatus 102 is an example of an external apparatus according to an exemplary embodiment of the present disclosure. The communication apparatus 101 is, for example, a printing apparatus.

In step S520 illustrated in FIG. 5, the CPU 221 functions as a storage unit and stores the setting information for previously-made initial settings for the communication apparatus 101. In step S501, the CPU 221 functions as a reception unit and receives the information about the communication apparatus 101 and the initial setting status from the communication apparatus 101. The information about the communication apparatus 101 is, for example, model information of the communication apparatus 101. The initial setting status is an example of initial setting start information. In step S510, the CPU 221 functions as a transmission unit. Upon receiving the initial setting status, the CPU 221 transmits setting information for initial settings to the communication apparatus 101 depending on the information about the communication apparatus 101 by referring to the setting information for the previously-made initial settings for the communication apparatus 101. The communication apparatus 101 receives the setting information for the initial settings from the terminal apparatus 102, and sets the setting information for the initial settings.

In step S517, the CPU 221 functions as the reception unit. After the transmission in step S510, the CPU 221 receives the setting information for the initial settings for the communication apparatus 101 from the communication apparatus 101. In step S520, the CPU 221 stores the setting information for the initial settings for the communication apparatus 101 received in step S517 in association with the information about the communication apparatus 101.

Specifically, in step S517, the CPU 221 receives the setting information for a plurality of initial setting items for the communication apparatus 101 from the communication apparatus 101. In step S520, the CPU 221 stores the setting information for some of the initial setting items in the setting information for the plurality of initial setting items for the communication apparatus 101 received in step S517. The setting information for some of the initial setting items is, for example, the setting information for the initial setting items used in steps S306 to S308, S313, and S314 illustrated in FIG. 3.

The above-described information about the communication apparatus 101 is, for example, model information of the communication apparatus 101, and is received from the communication apparatus 101. In step S505, if the CPU 221 determines that the setting information for the initial settings corresponding to the model information of the communication apparatus 101 is included in the setting information for the previously-made initial settings for the communication apparatus 101 (YES in step S505), the processing proceeds to step S506. In this case, the CPU 221 transmits the setting information for the initial settings corresponding to the model information of the communication apparatus 101 to the communication apparatus 101.

In step S505, if the CPU 221 determines that the setting information for the initial settings corresponding to the model information of the communication apparatus 101 is not included in the setting information for the previously-made initial settings for the communication apparatus 101, the processing proceeds to step S507. In this case, the CPU 221 transmits the setting information for the previously-made initial settings for the communication apparatus 101 to the communication apparatus 101 depending on the model information of the communication apparatus 101.

The above-described information about the communication apparatus 101 may include model information and network environment information of the communication apparatus 101, and may be received from the communication apparatus 101. In step S505, if the CPU 221 determines that the setting information for the initial settings corresponding to the model information and network environment information of the communication apparatus 101 is included in the setting information for the previously-made initial settings for the communication apparatus 101, the processing proceeds to step S506. In this case, the CPU 221 transmits the setting information for the initial settings corresponding to the model information and network environment information of the communication apparatus 101 to the communication apparatus 101.

In step S505, if the CPU 221 determines that the setting information for the initial settings corresponding to the model information and network environment information of the communication apparatus 101 is not included in the setting information for the previously-made initial settings for the communication apparatus 101, the processing proceeds to step S507. In this case, the CPU 221 transmits the setting information for the previously-made initial settings for the communication apparatus 101 to the communication apparatus 101 depending on the model information and network environment information of the communication apparatus 101.

In step S520, the CPU 221 stores setting information for a plurality of previously-made initial setting items for the communication apparatus 101. In step S510, the CPU 221 collectively transmits the setting information for the plurality of initial setting items to the communication apparatus 101. The CPU 221 may transmit setting information for a language setting to the communication apparatus 101, and then collectively transmit the setting information for the rest of the initial setting items to the communication apparatus 101.

In step S404 illustrated in FIG. 4, the communication apparatus 101 transmits a plurality of initial setting items to the terminal apparatus 102. The CPU 221 receives the plurality of initial setting items from the communication apparatus 101. In step S510, the CPU 221 transmits the setting information for the plurality of initial setting items to the communication apparatus 101. Specifically, the CPU 221 transmits the same setting information as the setting information for the previously-made initial settings for the communication apparatus 101 to the communication apparatus 101.

In step S506, the CPU 221 controls the screen 602 to display an inquiry about whether to transmit the same setting information as the setting information for the previously-made initial settings for the communication apparatus 101 as illustrated in FIG. 6B. If a transmission permission operation is performed, the CPU 221 transmits the same setting information as the setting information for the previously-made initial settings for the communication apparatus 101 to the communication apparatus 101.

In step S518, the CPU 221 controls the screen 603 to display the same setting information as the setting information for the previously-made initial settings for the communication apparatus 101 as illustrated in FIG. 6C. If a transmission permission operation is performed, the CPU 221 transmits the same setting information as the setting information for the previously-made initial settings for the communication apparatus 101 to the communication apparatus 101.

In step S510, the CPU 221 transmits setting information for some of the plurality of initial setting items for the communication apparatus 101 to the communication apparatus 101 based on the setting information for the plurality of previously-made initial setting items for the communication apparatus 101. The above-described setting information for some of the initial setting items is, for example, the setting information for the initial setting items used in steps S306 to S308, S313, and S314 illustrated in FIG. 3.

In step S515, the CPU 221 transmits the setting information for the other initial setting items in the plurality of initial setting items for the communication apparatus 101 to the communication apparatus 101 according to a user operation. The above-described setting information for the other initial setting items is, for example, the setting information for the initial setting items used in steps S311 and S312 illustrated in FIG. 3.

As described above, according to the present exemplary embodiment, the terminal apparatus 102 enables setting of setting information for initial settings for the communication apparatus 101 simply or in a short period of time. This eliminates the need for the user to repeatedly perform the same initial setting operation on the second and more communication apparatuses 101, which leads to an improvement in operating efficiency.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-107618, filed Jul. 4, 2022, which is hereby incorporated by reference herein in its entirety.

What is claimed is:

1. A setting information transmission apparatus comprising:
at least one processor and at least one memory coupled to the at least one processor, the at least one memory storing instructions, which when executed by the at least one processor, cause the at least one processor and the at least one memory to act as:
a storage unit configured to store setting information for an initial setting for an external apparatus in association with information about the external apparatus including network environment information about the external apparatus;
a first reception unit configured to receive information about an external apparatus and initial setting start information from the external apparatus;
a display control unit configured to display, in a case where setting information for an initial setting corresponding to the network environment information included in the received information about the external apparatus is stored, a screen for inquiring a user about whether to set the stored setting information for the initial setting on the external apparatus;
a first transmission unit configured to transmit, based on reception of a setting operation from the user on the screen, a language setting among the stored setting information for the initial setting to the external apparatus at a first timing at which the initial setting of the external apparatus has not been completed yet, wherein, when the language setting is transmitted, based on the language setting, a screen that shows a method for a predetermined operation is displayed by the external apparatus, the predetermined operation is an operation that is executed at the external apparatus and that is for the initial setting of the external apparatus;
a prompting unit configured to perform processing for prompting the user to perform the predetermined operation; and
a second transmission unit configured to transmit, to the external apparatus, information that includes at least setting information other than the language setting among the stored setting information for the initial setting at a second timing that is after transmitting the language setting and is after performing the processing for prompting the user to perform the predetermined operation.

2. The setting information transmission apparatus according to claim 1, wherein the instructions, when executed by the at least one processor, further cause the at least one processor and the at least one memory to act as a second reception unit configured to receive, from the external apparatus, the setting information for the initial setting for the external apparatus after the transmission by the transmission unit,
wherein the storage unit stores the setting information for the initial setting for the external apparatus received by the second reception unit in association with the information about the external apparatus.

3. The setting information transmission apparatus according to claim 2,
wherein the second reception unit receives setting information for a plurality of initial setting items for the external apparatus from the external apparatus, and
wherein the storage unit stores setting information for some of the plurality of initial setting items for the external apparatus received by the second reception unit.

4. The setting information transmission apparatus according to claim 1, wherein the information about the external apparatus is model information of the external apparatus.

5. The setting information transmission apparatus according to claim 4, wherein, in a case where setting information for an initial setting corresponding to the model information of the external apparatus is included in the setting information for the initial setting for the external apparatus, the transmission unit transmits the setting information for the initial setting corresponding to the model information of the external apparatus to the external apparatus.

6. The setting information transmission apparatus according to claim 5, wherein in a case where the setting information for the initial setting corresponding to the model information of the external apparatus is not included in the setting information for the initial setting for the external apparatus, the transmission unit transmits the setting information for the initial setting for the external apparatus with a product name close to a product name of the external apparatus to the external apparatus.

7. The setting information transmission apparatus according to claim 1, wherein in a case where the setting information for the initial setting corresponding to the network environment information of the external apparatus is not included in the setting information for the initial setting for the external apparatus, the transmission unit transmits the setting information for the initial setting for the external apparatus to the external apparatus depending on the network environment information of the external apparatus.

8. The setting information transmission apparatus according to claim 1,
wherein the storage unit stores setting information for a plurality of initial setting items for the external apparatus, and
wherein the transmission unit collectively transmits setting information for a plurality of initial setting items to the external apparatus.

9. The setting information transmission apparatus according to claim 1, wherein the instructions, when executed by the at least one processor, further cause the at least one processor and the at least one memory to act as a second reception unit configured to receive a plurality of initial setting items from the external apparatus,
wherein the transmission unit transmits setting information for the plurality of initial setting items to the external apparatus.

10. The setting information transmission apparatus according to claim 1, wherein the transmission unit transmits the same setting information as the setting information for the initial setting for the external apparatus to the external apparatus.

11. The setting information transmission apparatus according to claim 1, wherein the transmission unit performs control to display an inquiry as to whether the same setting information as the setting information for the initial setting for the external apparatus is to be transmitted, and in a case where an operation to permit the transmission is performed, the transmission unit transmits the same setting information as the setting information for the initial setting for the external apparatus to the external apparatus.

12. The setting information transmission apparatus according to claim 1, wherein the transmission unit performs control to display the same setting information as the setting information for the initial setting for the external apparatus, and in a case where an operation to permit the transmission is performed, the transmission unit transmits the same setting information as the setting information for the initial setting for the external apparatus to the external apparatus.

13. The setting information transmission apparatus according to claim 1,
wherein the storage unit stores setting information for a plurality of initial setting items for the external apparatus, and
wherein the transmission unit transmits setting information for some of a plurality of initial setting items for the external apparatus to the external apparatus based on the setting information for the plurality of initial setting items for the external apparatus, and transmits setting information for other initial setting items for the external apparatus according to a user operation.

14. The setting information transmission apparatus according to claim 1, wherein the external apparatus is a printing apparatus.

15. A system comprising:
the setting information transmission apparatus according to claim 1; and
an external apparatus configured to receive the setting information for the initial setting from the setting information transmission apparatus and set the setting information for the initial setting.

16. The setting information transmission apparatus according to claim 1, wherein the display control unit displays the screen based on a determination that the information about an external apparatus a same as the external apparatus information about which has been received is stored and that the network environment information of an external apparatus a same as the external apparatus the network environment information of which has been received is stored.

17. The setting information transmission apparatus according to claim 1,
wherein the instructions, when executed by the at least one processor, further cause the at least one processor and the at least one memory to act as a display unit configured to display a list of setting information for an initial setting to be transmitted to the external apparatus, and
wherein the setting information for the initial setting includes the language setting, a nation setting and a date setting.

18. The setting information transmission apparatus according to claim 1, wherein in a case where an initial setting for the external apparatus is not completed by transmitting the stored setting information for the initial setting to the external apparatus, a confirmation screen for individual setting information is displayed and corresponding setting information is transmitted to the external apparatus when an operation is received on the confirmation screen from the user.

19. A processing method for a setting information transmission apparatus, the processing method comprising:
storing setting information for an initial setting for an external apparatus in association with information about the external apparatus including network environment information about the external apparatus;
receiving information about an external apparatus and initial setting start information from the external apparatus;
displaying, in a case where setting information for an initial setting corresponding to the network environment information included in the received information about the external apparatus is stored, a screen for inquiring a user about whether to set the stored setting information for the initial setting on the external apparatus;
transmitting, based on reception of a setting operation from the user on the screen, a language setting among the stored setting information for the initial setting to the external apparatus at a first timing at which the initial setting of the external apparatus has not been completed yet, wherein, when the language setting is transmitted, based on the language setting, a screen that shows a method for a predetermined operation is displayed by the external apparatus, the predetermined operation is an operation that is executed at the external apparatus and that is for the initial setting of the external apparatus;
performing processing for prompting the user to perform the predetermined operation; and
transmitting, to the external apparatus, information that includes at least setting information other than the language setting among the stored setting information for the initial setting at a second timing that is after transmitting the language setting and is after performing the processing for prompting the user to perform the predetermined operation.

20. A non-transitory computer-readable storage medium storing one or more programs including instructions, which when executed by one or more processors of the setting information transmission apparatus, cause the setting information transmission apparatus to perform the processing method according to claim 19.

* * * * *